(12) United States Patent
Hoffart (10) Patent No.: US 7,562,727 B1
(45) Date of Patent: Jul. 21, 2009

(54) TRACK SUSPENSION SYSTEM FOR A SKID STEER LOADER

(75) Inventor: Ronald J. Hoffart, West Fargo, ND (US)

(73) Assignee: Ramco Products, Inc., West Fargo, ND (US)

( * ) Notice: Subject to any disclaimer, the term of this patent is extended or adjusted under 35 U.S.C. 154(b) by 393 days.

(21) Appl. No.: 11/318,291

(22) Filed: Dec. 22, 2005

(51) Int. Cl.
*B62D 55/04* (2006.01)
(52) U.S. Cl. .................. 180/9.1; 180/9.26; 180/9.32
(58) Field of Classification Search .......... 180/9.1, 180/9.26, 9.32
See application file for complete search history.

(56) References Cited

U.S. PATENT DOCUMENTS

| | | | | |
|---|---|---|---|---|
| 3,826,325 A | * | 7/1974 | Purcell et al. | 180/9.54 |
| 4,097,093 A | * | 6/1978 | Shelby et al. | 305/125 |
| 4,874,052 A | * | 10/1989 | Purcell et al. | 180/9.1 |
| 2005/0145422 A1 | * | 7/2005 | Loegering et al. | 180/9.26 |

OTHER PUBLICATIONS

Versatile Track System, Loegering, Brochure, Jun. 2004, 2 pages.

* cited by examiner

*Primary Examiner*—Paul N Dickson
*Assistant Examiner*—Michael R Stabley (57) ABSTRACT

A track suspension system for a skid steer loader for effectively traversing rough terrain. The track suspension system for a skid steer loader includes an undercarriage attached to a skid steer loader, a drive wheel attached to a wheel axle of the skid steer loader, a front roller movably attached to a front portion of the undercarriage, a rear roller movably attached to a rear portion of the undercarriage, a plurality of lower idlers movably attached to the undercarriage, and a track movably extending about the wheels and idlers.

12 Claims, 10 Drawing Sheets

TRACK SUSPENSION SYSTEM FOR A SKID STEER LOADER

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to track suspensions for skid steer loaders and more specifically it relates to a track suspension system for a skid steer loader for effectively traversing rough terrain.

2. Description of the Related Art

Any discussion of the prior art throughout the specification should in no way be considered as an admission that such prior art is widely known or forms part of common general knowledge in the field.

Skid steer loaders have been in use for years. Conventional skid steer loaders have four tires (two on each side) and utilize "skid steering" to turn, move forward and move rearward. For years, tracks have been positioned about the tires of skid steer loaders to improve floatation and traction on various surface conditions. An exemplary track utilized upon skid steer loaders is manufactured by GROUSER PRODUCTS, INC. in West Fargo, N. Dak.

Unfortunately, attaching tracks about the tires of a skid steer loader can result in a relatively rough ride for the operator of the skid steer loader since there is no suspension on a skid steer loader. In addition, when the track positioned about the tires of a skid steer loader engages an obstacle, a load within the bucket may become partially or fully dislodged.

While conventional tracks for skid steer loaders may be suitable for the particular purpose to which they address, they are not as suitable for effectively traversing rough terrain. Conventional tracks for skid steer loaders can provide a relatively rough ride for an operator and dislodging of a load within a bucket during operation.

In these respects, the track suspension system for a skid steer loader according to the present invention substantially departs from the conventional concepts and designs of the prior art tracks for skid steer loaders, and in so doing provides an apparatus primarily developed for the purpose of effectively traversing rough terrain.

BRIEF SUMMARY OF THE INVENTION

In view of the foregoing disadvantages inherent in the known types of track systems for skid steer loaders now present in the prior art, the present invention provides a new track suspension system for a skid steer loader construction wherein the same can be utilized for effectively traversing rough terrain.

The general purpose of the present invention, which will be described subsequently in greater detail, is to provide a new track suspension system for a skid steer loader that has many of the advantages of the track systems for skid steer loaders mentioned heretofore and many novel features that result in a new track suspension system for a skid steer loader which is not anticipated, rendered obvious, suggested, or even implied by any of the prior art track systems for skid steer loaders, either alone or in any combination thereof.

To attain this, the present invention generally comprises an undercarriage attached to a skid steer loader, a drive wheel attached to a wheel axle of the skid steer loader, a front roller movably attached to a front portion of the undercarriage, a rear roller movably attached to a rear portion of the undercarriage, a plurality of lower idlers movably attached to the undercarriage, and a track movably extending about the wheels and idlers.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a track suspension system for a skid steer loader that will overcome the shortcomings of the prior art track systems.

A second object is to provide a track suspension system for a skid steer loader for effectively traversing rough terrain.

Another object is to provide a track suspension system for a skid steer loader that may be utilized upon various tractors including but not limited to skid-steer loaders.

An additional object is to provide a track suspension system for a skid steer loader that improves the handling of a tractor with tracks.

A further object is to provide a track suspension system for a skid steer loader that is capable of locking into a desired suspension position.

Another object is to provide a track suspension system for a skid steer loader that is easily attached or removed from a conventional tractor.

A further object is to provide a track suspension system for a skid steer loader that maintains substantially constant track tension and track path length at all times.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Turning now descriptively to the drawings, in which similar reference characters denote similar elements throughout the several views, FIGS. 1a through 5d illustrate a track suspension system for a skid steer loader 10, which comprises an undercarriage 20 attached to a skid steer loader 16, a drive wheel 30 attached to a wheel axle (or drive shaft) of the skid steer loader 16, a front roller 40 movably attached to a front portion of the undercarriage 20, a rear roller 60 movably attached to a rear portion of the undercarriage 20, a plurality of lower idlers 50 movably attached to the undercarriage 20, and a track 24 movably extending about the wheels and idlers. While the discussion of the present invention involves a single track 24 suspension system, it can be appreciated that the present invention is intended for use as a pair of track 24 suspension systems operated on opposing sides of the skid steer loader 16.

B. Base Embodiment

FIGS. 1a through 5d illustrate an undercarriage 20 adapted to be attached to a skid steer loader 16 either in a movable or non-movable manner. In addition, a first drive wheel 30 is adapted to be attached to a first wheel axle (or drive shaft) of the skid steer loader 16. The first drive wheel 30 is adapted to engage the track 24 for rotating the track 24 about the rollers 40, 60 and lower idlers 50 which is well known in the art of tracks 24.

A front roller 40 is movably and rotatably attached to a front portion of the undercarriage 20, and a rear roller 60 is movably and rotatably attached to a rear portion of the undercarriage 20 opposite of the front roller 40 as illustrated in FIGS. 1a through 5d of the drawings. The front roller 40 and the rear roller 60 are preferably larger in diameter than the lower idlers 50 as further shown in the figures.

A plurality of lower idlers 50 are movably and rotatably attached to the undercarriage 20 as also shown in FIGS. 1a through 5d of the drawings. The lower idlers 50 engage an inner surface of the track 24 for supporting the present invention upon the track 24 as shown in the figures.

The track 24 is movably extending about the first drive wheel 30, the front roller 40, the rear roller 60 and the plurality of lower idlers 50. The track 24 may be comprised of various types of materials and structures capable of being utilized as an endless track 24 (e.g. rubber, connected pads and the like).

C. First Alternative Embodiment

In the first alternative embodiment of the present invention shown in FIGS. 1a through 1d of the drawings, the undercarriage 20 is adapted to be non-movably attached to a skid steer loader 16. The undercarriage 20 may be connected to the skid steer loader 16 utilizing various conventional attachment devices and fasteners including but not limited to brackets. The undercarriage 20 is preferably comprised of an elongated structure as illustrated in FIGS. 1a through 5d of the drawings.

As further shown in FIGS. 1a through 1d of the drawings, at least one middle walking beam 52 is pivotally attached to the undercarriage 20. The middle walking beam 52 rotatably supports a pair of opposing lower idlers 50. The middle walking beam 52 may include a torsion pivot 56 or other biasing means (e.g. torsion bar, torsion spring, springs, rubber torsion springs) for applying a bi-directional force to the middle walking beam 52.

A front walking beam 52 is pivotally attached to the undercarriage 20 as shown in FIGS. 1a through 1d of the drawings. A front connector 42 is rotatably attached to and supporting the front roller 40 as further shown in FIGS. 1a through 1d of the drawings. A front upper member 44 is pivotally connected to the undercarriage 20 and a first portion of the front connector 42. The front walking beam 52 rotatably supports one of the plurality of the lower idlers 50 at one end of the front walking beam 52 as shown in FIGS. 1a through 1d of the drawings. An opposing end of the front walking beam 52 is pivotally connected to a second portion of the front connector 42. The portion of the front walking beam 52 connected to the second portion of the front connector 42 is preferably substantially parallel to the front upper member 44 as illustrated in FIGS. 1a through 1d of the drawings. However, the portion of the front walking beam 52 connected to the second portion of the front connector 42 may be at non-parallel angles with respect to the front upper member 44.

A rear walking beam 52 is pivotally attached to the undercarriage 20 as shown in FIGS. 1a through 1d of the drawings. A rear connector 62 is rotatably attached to and supporting the rear roller 60 as further shown in FIGS. 1a through 1d of the drawings. A rear upper member 64 is pivotally connected to the undercarriage 20 and a first portion of the rear connector 62. The rear walking beam 52 rotatably supports one of the plurality of the lower idlers 50 at one end of the rear walking beam 52 as shown in FIGS. 1a through 1d of the drawings. An opposing end of the rear walking beam 52 is pivotally connected to a second portion of the rear connector 62.

The portion of the rear walking beam 52 connected to the second portion of the rear connector 62 is preferably substantially parallel to the rear upper member 64 as illustrated in FIGS. 1a through 1d of the drawings. However, the portion of the rear walking beam 52 connected to the second portion of the rear connector 62 may be at non-parallel angles with respect to the rear upper member 64. One or more stoppers 22 are preferably attached to the undercarriage 20 for limiting the movement of the walking beams 52.

The rear walking beam 52, the rear connector 62 and the rear upper member 64 preferably have lengths and pivot point locations chosen so as to not significantly favor an up or down movement of the rear roller 60 during operation of the track 24 to prevent hopping of the rear roller 60. There are three main forces that require consideration in calculating the lengths and pivot point locations is the track tension, the weight of the skid steer loader 16 and the pulling force on the track by the drive wheel 30 or drive shaft. The same geometry requirements apply to the front roller 40.

A tension idler 70 is preferably movably and rotatably connected to the front portion of the undercarriage 20 as illustrated in FIGS. 1a through 1d of the drawings. A tension connector 74 is pivotally attached to the undercarriage 20 and rotatably supports the tension idler 70. A tension actuator 72 is connected between the tension connector 74 and the undercarriage 20 for providing a biasing force upon the tension connector 74 for causing the tension idler 70 to maintain the track 24 in a substantially taut state. The tension actuator 72 may be comprised of various actuator devices including but not limited to air shocks, spring actuators, hydraulic pressure actuators and the like.

Figure 1A:
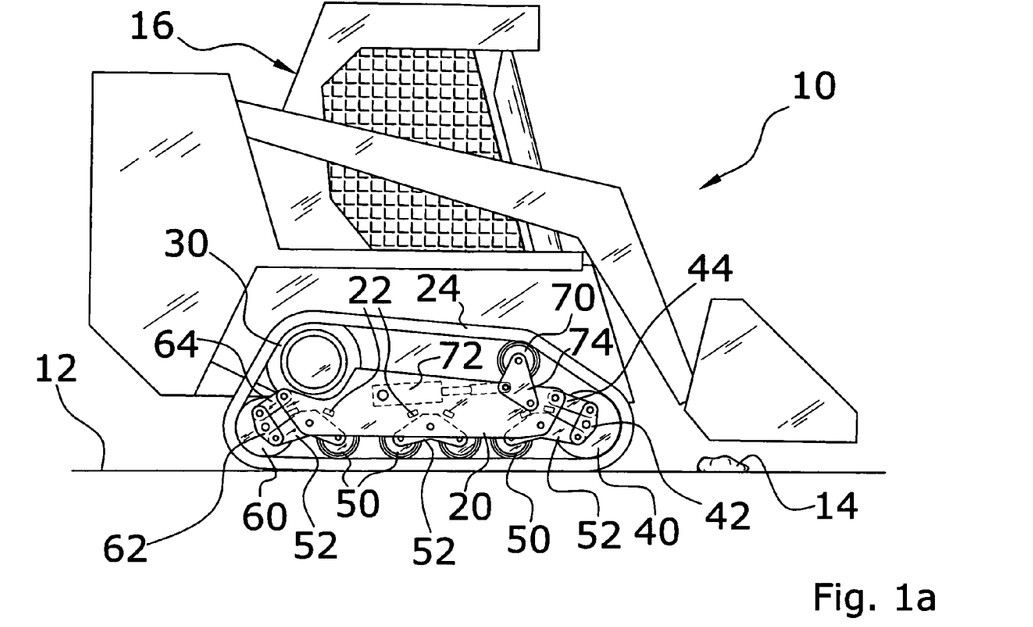
FIG. 1a is a side view of a first embodiment of the present invention approaching an obstacle on a ground surface.

FIGS. 1a through 1d of the drawings illustrate the overall operation and usage of the first alternative embodiment. FIG. 1a illustrates the track 24 suspension in a normal state operating on a substantially level ground surface 12.

Figure 1B:
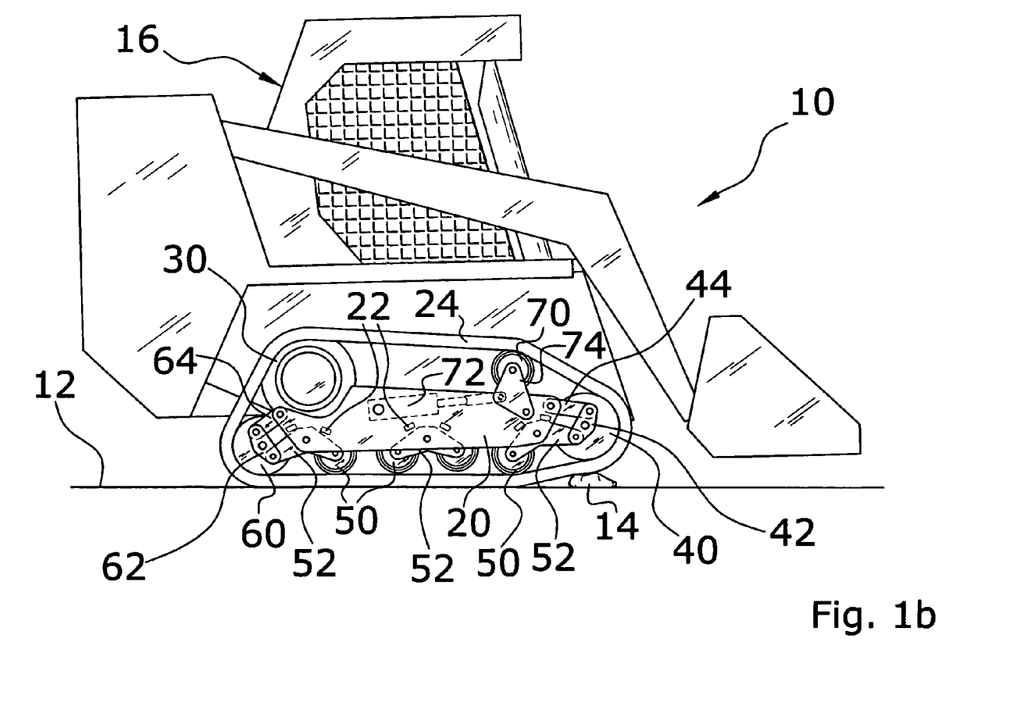
FIG. 1b is a side view of the first embodiment of the present invention with the obstacle positioned beneath a front portion of the track.

FIG. 1b illustrates the front portion of the track 24 engaging an obstacle 14 (e.g. rock) wherein the front roller 40 is forced upwardly by the obstacle 14. When the front roller 40 is forced upwardly, the lower idler connected to the front walking beam 52 is forced downwardly as shown in FIG. 1b of the drawings.

Figure 1C:
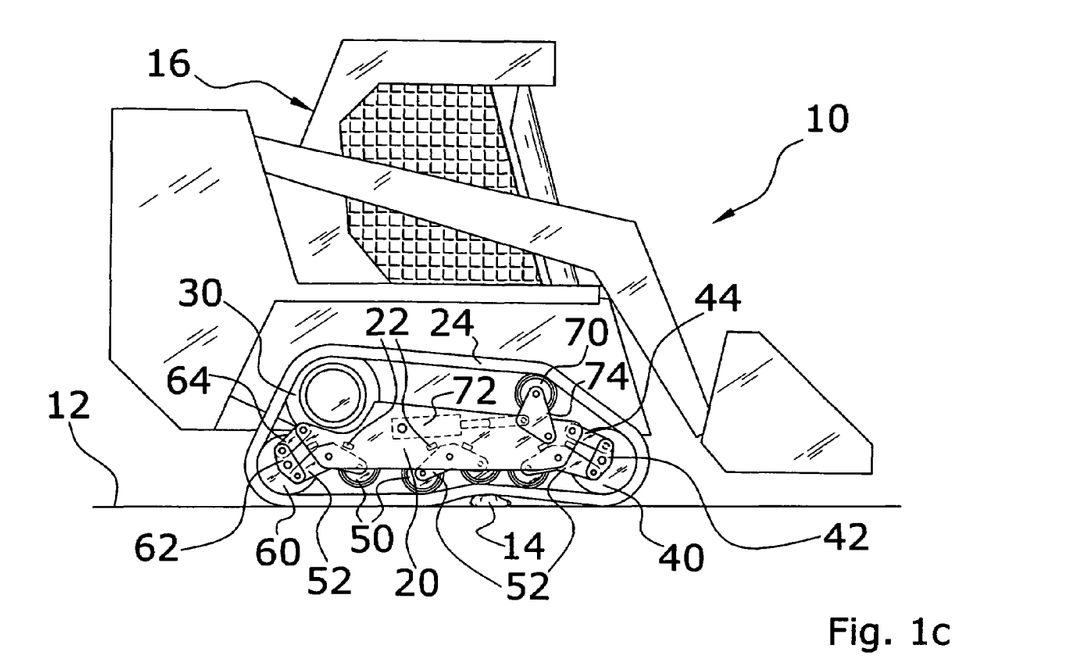
FIG. 1c is a side view of the first embodiment of the present invention with the obstacle positioned beneath a middle portion of the track.
Figure 1D:
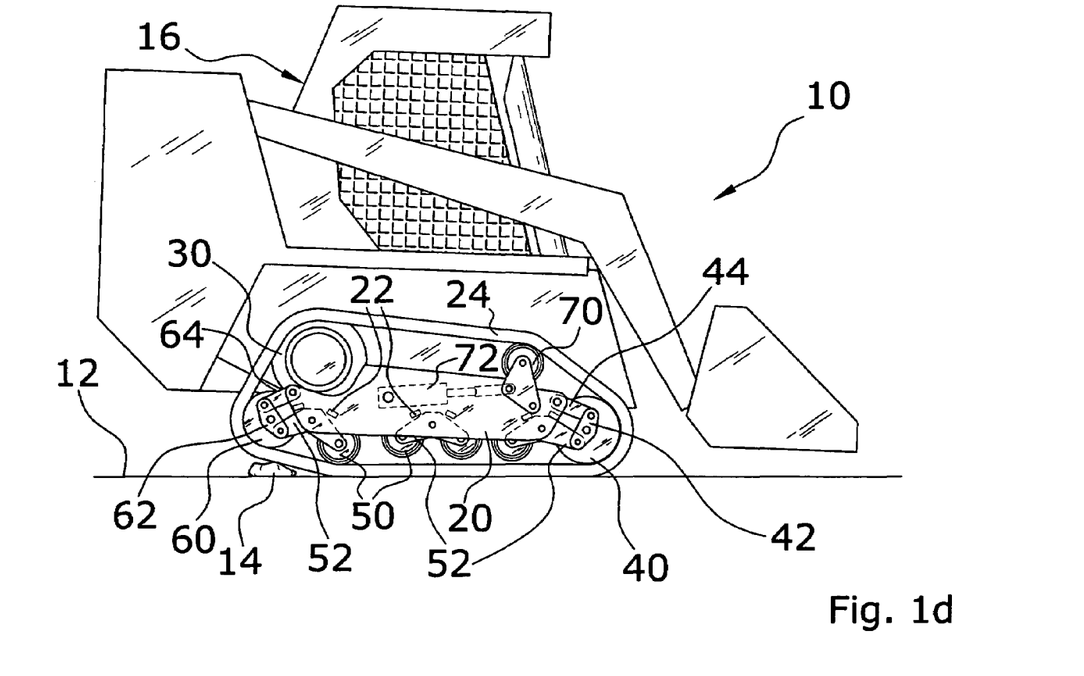
FIG. 1d is a side view of the first embodiment of the present invention with the obstacle positioned beneath a rear portion of the track.

FIG. 1c illustrates the track 24 traversing over the obstacle 14 with the front roller 40 lowered and with the lower idler connected to the front walking beam 52 raised. FIG. 1d illustrates the obstacle 14 beneath a rear portion of the track 24 wherein the rear roller 60 is forced upwardly by the obstacle 14. When the rear roller 60 is forced upwardly, the lower idler connected to the rear walking beam 52 is forced downwardly as shown in FIG. 1d of the drawings. After the obstacle 14 has been passed over, the rear roller 60 and the lower idler connected to the rear walking beam 52 return to their normal position as shown in FIG. 1a of the drawings. During operation of the first alternative embodiment, the tension idler 70 maintains a relatively consistent tension within the track 24.

D. Second Alternative Embodiment

FIGS. 2a through 2d illustrate a second embodiment of the present invention that includes a second drive wheel 30 adapted to be attached to a second wheel axle of the skid steer loader 16. It can be appreciated that the second drive wheel 30 may also be utilized within the first alternative embodiment and the other embodiments. The second drive wheel 30 is adapted to engage the track 24 for rotating the track 24 about the rollers 40, 60 and lower idlers 50 which is well known in the art of tracks 24. A track tensioning device is preferably utilized within the second embodiment to maintain a desired track tension.

As further shown in FIGS. 2a through 2d of the drawings, a front bell crank 79 is pivotally attached to a front portion of the undercarriage 20. In addition, a front upper idler 76 is rotatably supported upon a first portion of the front bell crank 79 with a link member 78 connected between the front roller 40 and a second portion of the front bell crank 79 as shown in FIGS. 2a through 2d of the drawings.

As further shown in FIGS. 2a through 2d of the drawings, a rear bell crank 79 is pivotally attached to a rear portion of the undercarriage 20. In addition, a rear upper idler 76 is rotatably supported upon a first portion of the rear bell crank 79 with a link member 78 connected between the rear roller 60 and a second portion of the rear bell crank 79 as shown in FIGS. 2a through 2d of the drawings.

FIGS. 2a through 2d further illustrate the usage of a plurality of lower arms 54 pivotally attached to the undercarriage 20 for rotatably supporting the plurality of lower idlers 50 instead of a middle walking beam 52. The plurality of lower arms 54 are each preferably pivotally connected to the undercarriage 20 by a torsion pivot 56 or similar biasing means for applying a downward biasing force upon the lower idlers 50. It can be appreciated that the second alternative embodiment may be operated utilizing the middle walking beam 52 as shown in FIGS. 1a through 1d of the drawings.

Figure 2A:
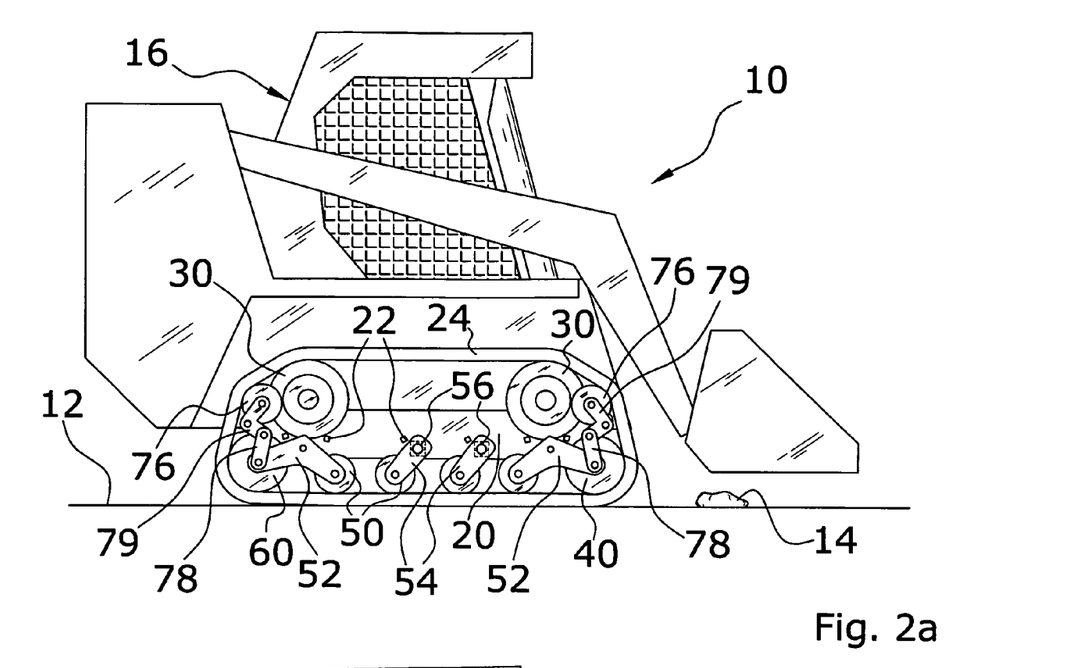
FIG. 2a is a side view of a second embodiment of the present invention approaching an obstacle on a ground surface.

FIGS. 2a through 2d of the drawings illustrate the overall operation and usage of the second alternative embodiment. FIG. 2a illustrates the track 24 suspension in a normal state operating on a substantially level ground surface 12.

Figure 2B:
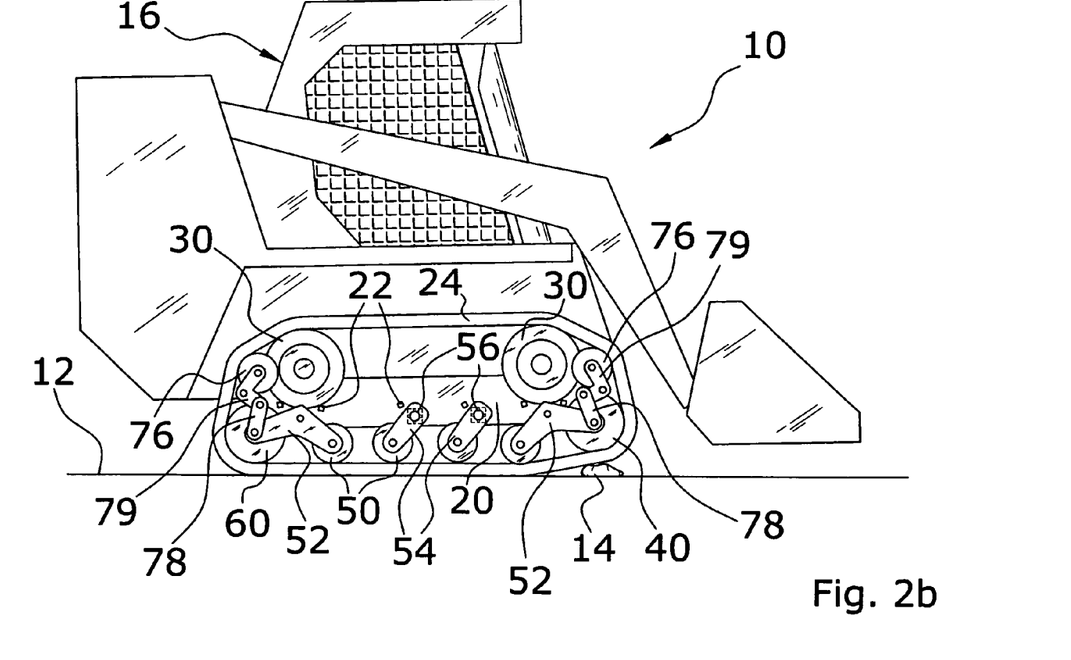
FIG. 2b is a side view of the second embodiment of the present invention with the obstacle positioned beneath a front portion of the track.

FIG. 2b illustrates the front portion of the track 24 engaging an obstacle 14 (e.g. rock) wherein the front roller 40 is forced upwardly by the obstacle 14. When the front roller 40 is forced upwardly, the lower idler connected to the front walking beam 52 is forced downwardly as shown in FIG. 2b of the drawings. In addition, the front upper idler 76 is extended forwardly by the front bell crank 79 thereby maintaining a substantially consistent track path length for the track 24.

Figure 2C:
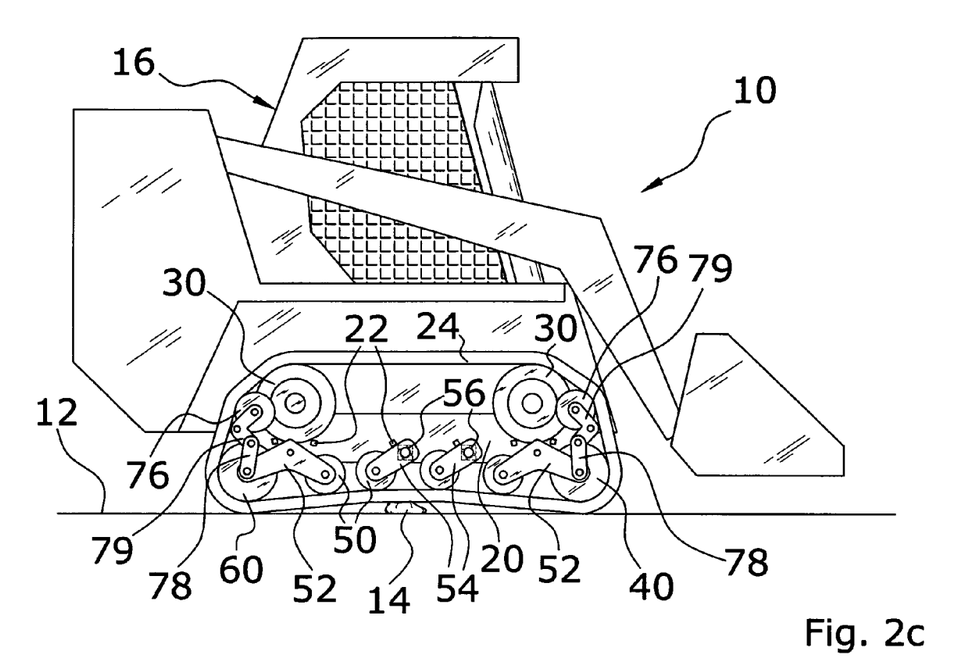
FIG. 2c is a side view of the second embodiment of the present invention with the obstacle positioned beneath a middle portion of the track.
Figure 2D:
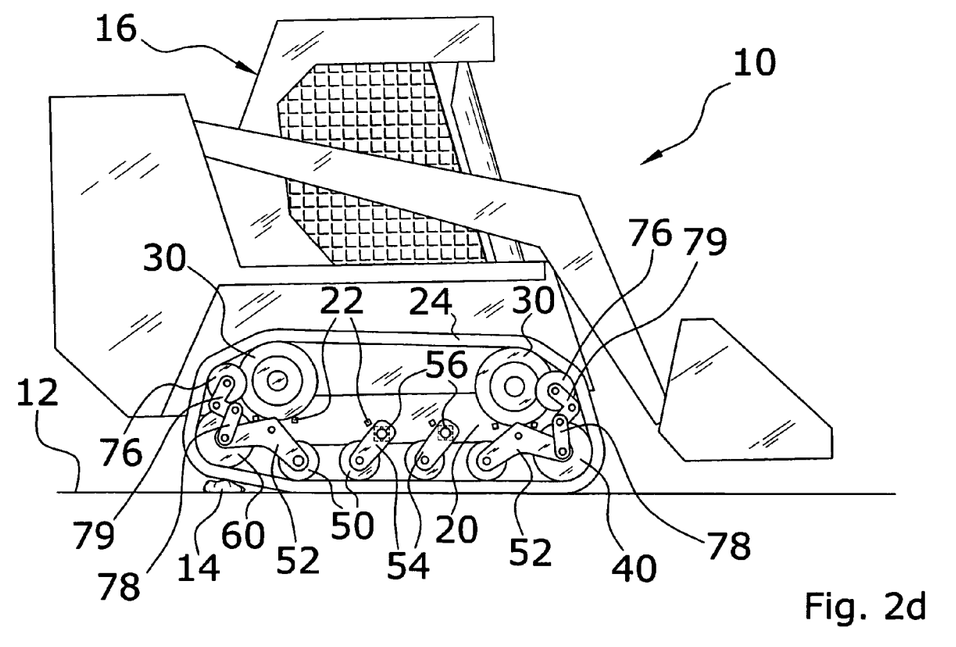
FIG. 2d is a side view of the second embodiment of the present invention with the obstacle positioned beneath a rear portion of the track.
Figure 3A:
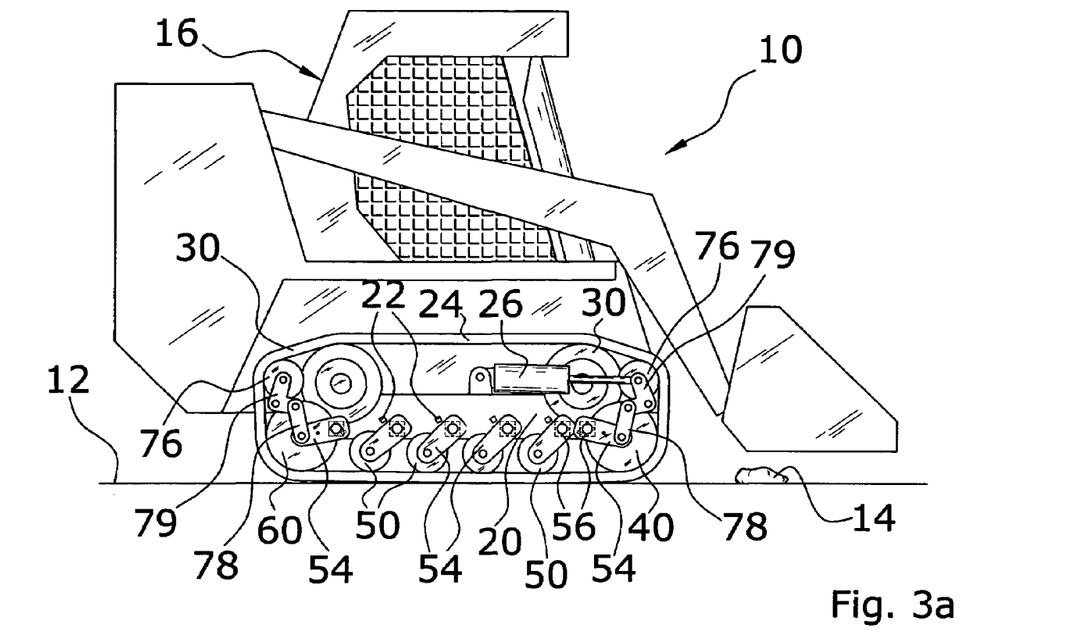
FIG. 3a is a side view of a third embodiment of the present invention approaching an obstacle on a ground surface.
Figure 3B:
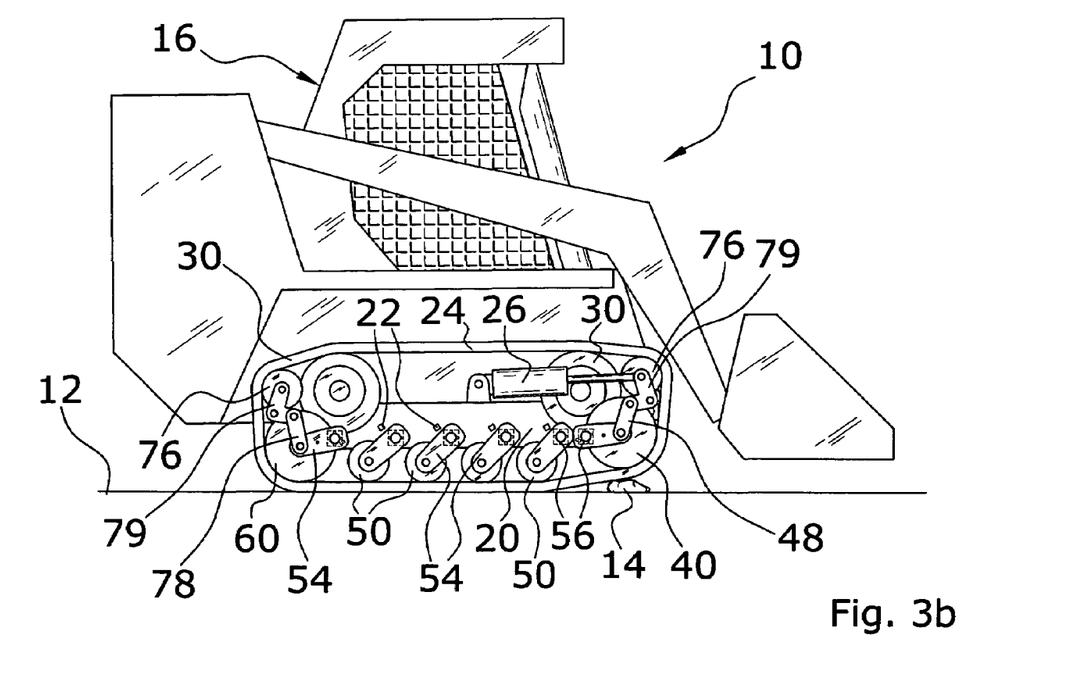
FIG. 3b is a side view of the third embodiment of the present invention with the obstacle positioned beneath a front portion of the track.
Figure 3C:
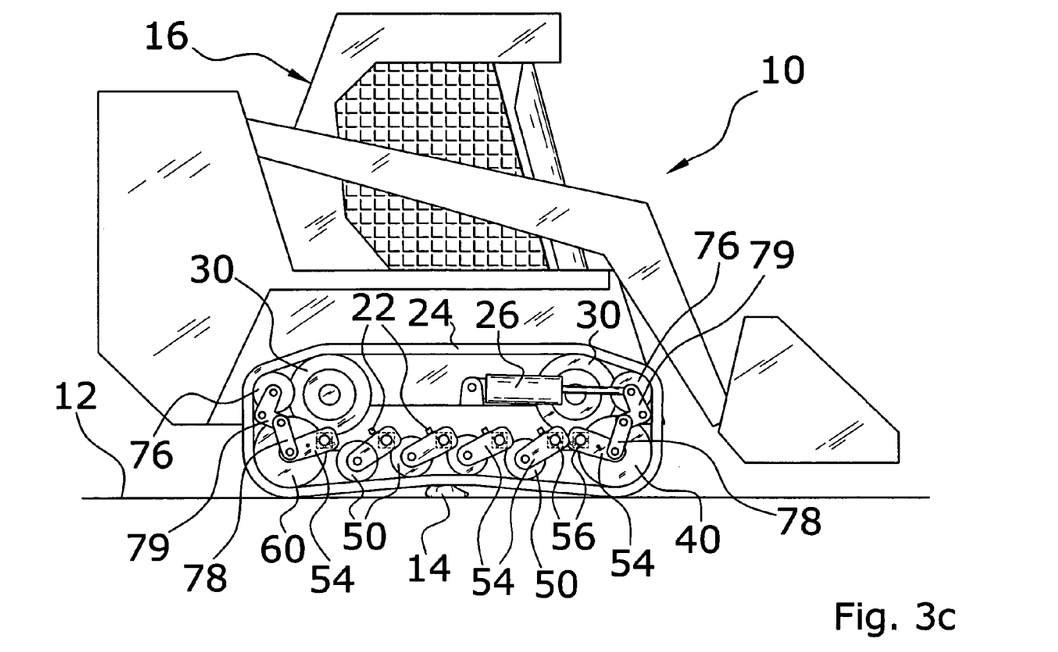
FIG. 3c is a side view of the third embodiment of the present invention with the obstacle positioned beneath a middle portion of the track.
Figure 3D:
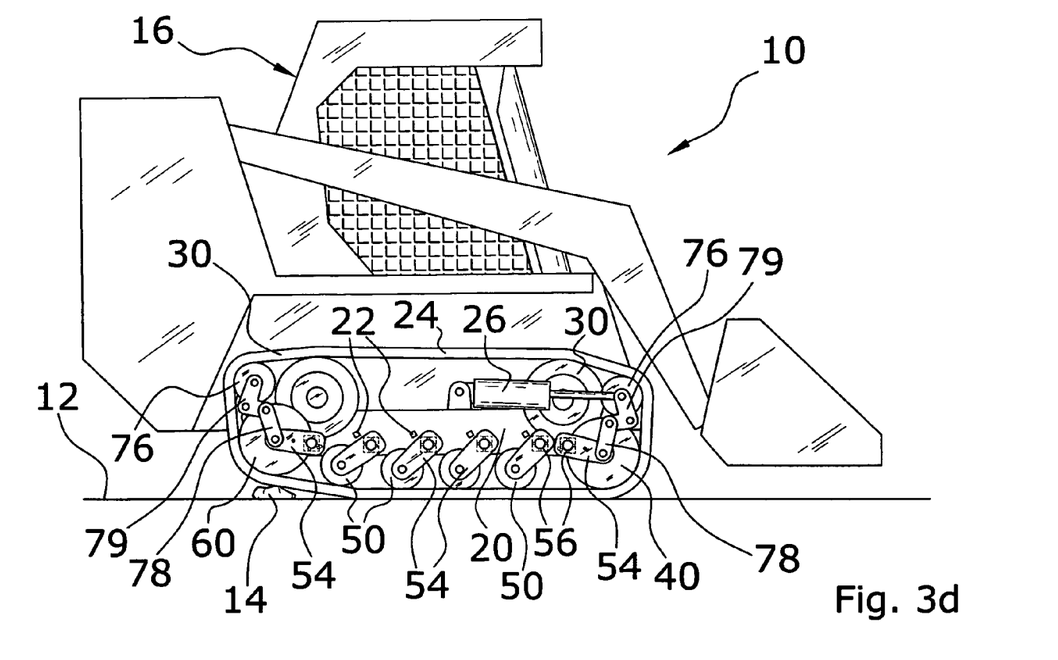
FIG. 3d is a side view of the third embodiment of the present invention with the obstacle positioned beneath a rear portion of the track.

FIG. 2c illustrates the track 24 traversing over the obstacle 14 with the front roller 40 lowered and with the lower idler connected to the front walking beam 52 raised. FIG. 2d illustrates the obstacle 14 beneath a rear portion of the track 24 wherein the rear roller 60 is forced upwardly by the obstacle 14. When the rear roller 60 is forced upwardly, the lower idler connected to the rear walking beam 52 is forced downwardly as shown in FIG. 2d of the drawings. In addition, the rear upper idler 76 is extended rearwardly by the rear bell crank 79 thereby maintaining a substantially consistent track path length for the track 24.

After the obstacle 14 has been passed over, the rear roller 60 and the lower idler connected to the rear walking beam 52 return to their normal position as shown in FIG. 2a of the drawings.

E. Third Alternative Embodiment

The third alternative embodiment is similar to the second alternative embodiment with the exception of the front and rear walking beams 52 are replaced with lower arms 54 to support the front roller 40, the rear roller 60 and the previously associated lower idlers 50 as illustrated in FIGS. 3a through 3d of the drawings.

In addition, a lockout unit 26 is connected between the front bell crank 79 and the undercarriage 20 to prevent movement of the front roller 40 when lifting heavy loads or when digging to prevent over compression of the front portion of the track 24 suspension. The lockout unit 26 selectively prevents movement of the front bell crank 79 thereby preventing upward movement of the front roller 40 as shown in FIGS. 3a through 3d of the drawings. The lockout unit 26 may be comprised of a simple mechanical hand operated structure or comprised of a hydraulic actuator that is controlled by the user to either "float" or "lock." The lockout unit 26 may also be utilized as a track tensioning device to maintain a desired tension within the track 24.

Operation of the third alternative embodiment shown in FIGS. 3a through 3d is similar to the operation of the second alternative embodiment discussed above. However, when the operator is about to transport a heavy load within the bucket of the skid steer loader 16 or needs to dig into the ground surface 12 with the bucket, the operator first manipulates the lockout unit 26 to prevent movement of the front bell crank 79 and thereby prevents movement of the front roller 40 to avoid compression of the track 24 suspension.

F. Fourth Alternative Embodiment

The fourth alternative embodiment is illustrated in FIGS. 4a through 4d of the drawings. The fourth alternative embodiment is similar to the first, second and third alternative embodiments with the exception of the usage of a front beam 58 and a rear beam 59 for supporting the front roller 40 and rear roller 60 respectively. In addition, FIGS. 4a through 4d illustrate the front roller 40 and the rear roller 60 preferably having a diameter similar to the diameter of the lower idlers 50.

The front beam 58 is pivotally connected to the front portion of the undercarriage 20 and an upper idler 76 is rotatably connected to the front beam 58 as shown in FIGS. 4a through 4d of the drawings. The front beam 58 rotatably supports the front upper idler 76 opposite of the front roller 40. The front beam 58 may be connected to the undercarriage 20 with a torsion pivot 56 or similar biasing means.

The rear beam 59 is pivotally connected to the rear portion of the undercarriage 20 and an upper idler 76 is rotatably connected to the rear beam 59 as shown in FIGS. 4a through 4d of the drawings. The rear beam 59 rotatably supports the rear upper idler 76 opposite of the rear roller 60. The rear beam 59 may be connected to the undercarriage 20 with a torsion pivot 56 or similar biasing means. A lockout unit 26 is connected to the front beam 58 for selectively locking the front portion of the track 24 suspension.

Figure 4A:
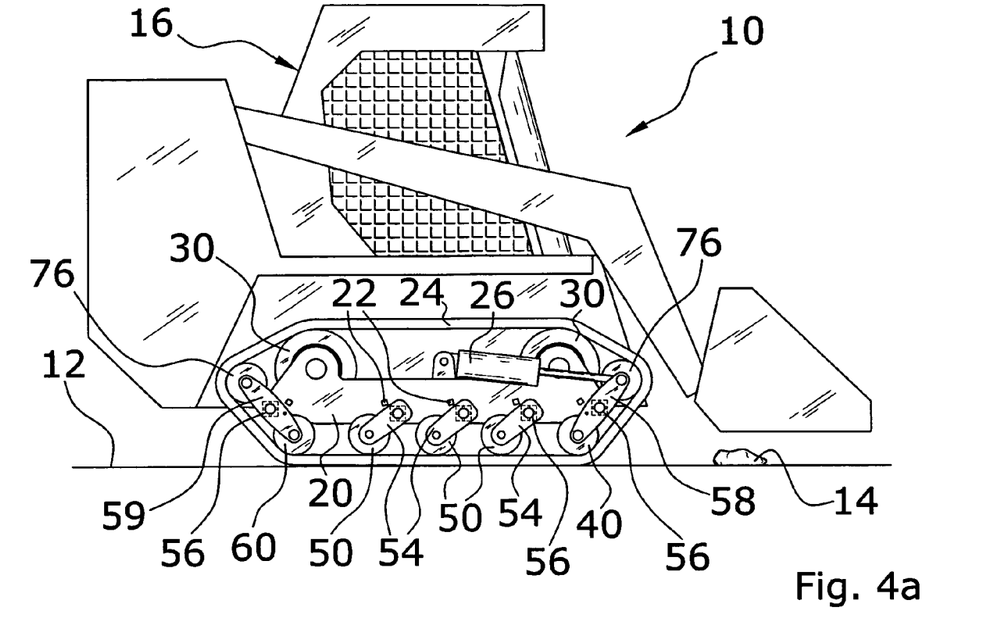
FIG. 4a is a side view of a fourth embodiment of the present invention approaching an obstacle on a ground surface.

FIGS. 4a through 4d of the drawings illustrate the overall operation and usage of the fourth alternative embodiment. FIG. 4a illustrates the track 24 suspension in a normal state operating on a substantially level ground surface 12.

Figure 4B:
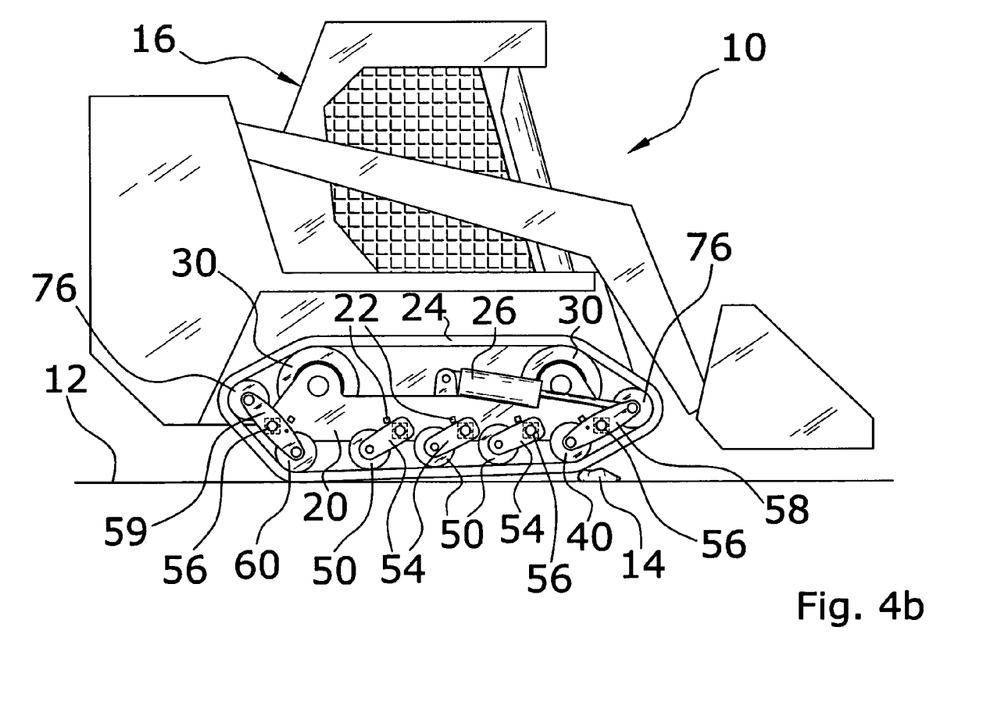
FIG. 4b is a side view of the fourth embodiment of the present invention with the obstacle positioned beneath a front portion of the track.

FIG. 4b illustrates the front portion of the track 24 engaging an obstacle 14 (e.g. rock) wherein the front roller 40 is forced upwardly by the obstacle 14. When the front roller 40 is forced upwardly, the front upper idler 76 connected to the front beam 58 is forced forwardly to compensate for the slack in the track 24 created by the upward movement of the front roller 40 as shown in FIG. 4b of the drawings.

Figure 4C:
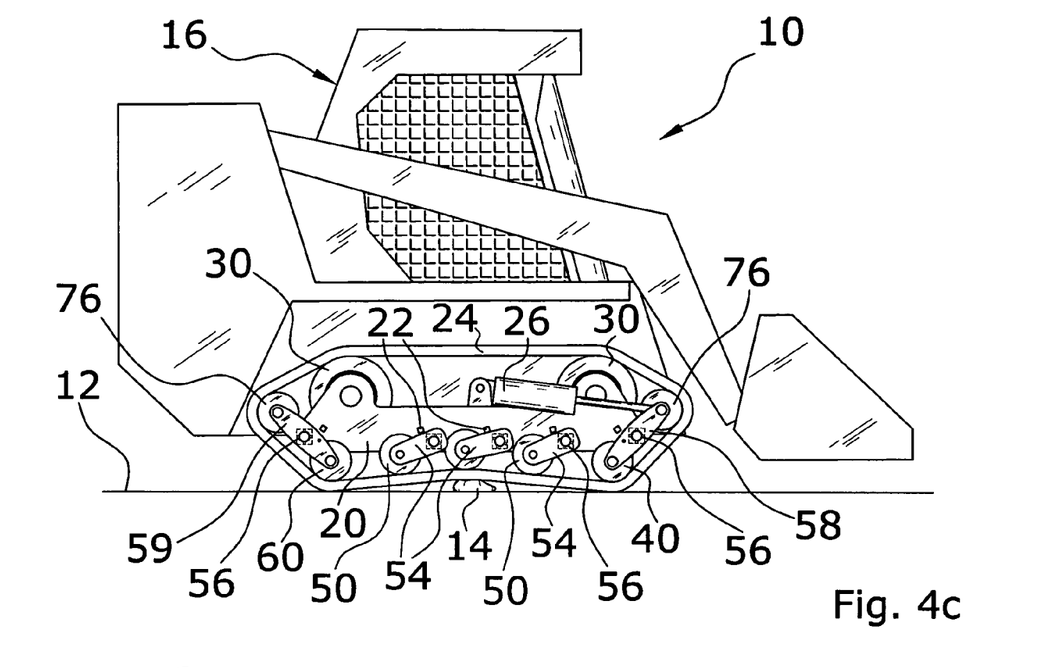
FIG. 4c is a side view of the fourth embodiment of the present invention with the obstacle positioned beneath a middle portion of the track.

FIG. 4c illustrates the track 24 traversing over the obstacle 14 with the front roller 40 and the front upper idler 76 in their original state. The lower idlers 50 are pivoted upwardly because of the upward force on the track 24 caused by the obstacle 14.

Figure 4D:
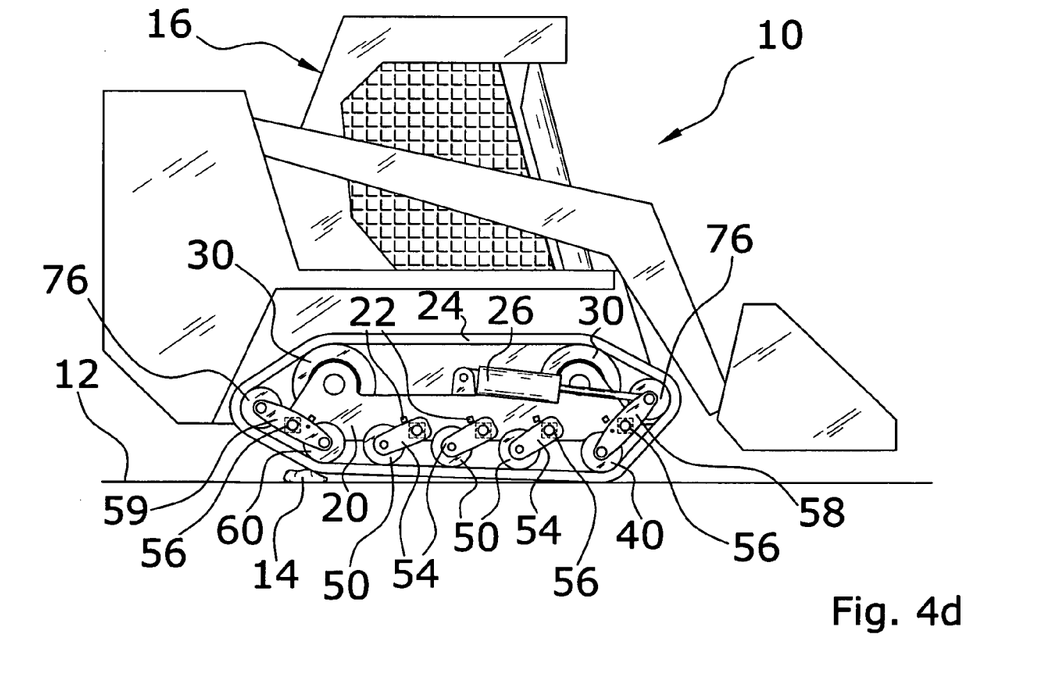
FIG. 4d is a side view of the fourth embodiment of the present invention with the obstacle positioned beneath a rear portion of the track.

FIG. 4d illustrates the obstacle 14 beneath a rear portion of the track 24 wherein the rear roller 60 is forced upwardly by the obstacle 14. When the rear roller 60 is forced upwardly, the rear upper idler 76 connected to the rear beam 59 is forced forwardly to compensate for the slack in the track 24 created by the upward movement of the rear roller 60 as shown in FIG. 4d of the drawings.

After the obstacle 14 has been passed over, the rear roller 60 and the rear upper idler 76 connected to the rear beam 59 return to their normal position as shown in FIG. 4a of the drawings.

G. Fifth Alternative Embodiment

The fifth alternative embodiment of the present invention is comprised of a single walking beam 52 connected to the undercarriage 20 as illustrated in FIGS. 5a through 5d of the drawings. The front roller 40 is preferably movably attached to the front end of the walking beam 52 and is biased forwardly by a bias unit 55 (e.g. spring, hydraulic actuator, etc.). In particular, the front roller 40 is slidably received in a receiver slot 53 within the walking beam 52 that allows forwardly and rearwardly movement of the front roller 40 as shown in FIGS. 5a through 5d of the drawings.

The rear roller 60 may be movably or non-movably attached to the rear end of the walking beam 52 opposite of the front roller 40 and is biased rearward by a bias unit 55 (e.g. spring, hydraulic actuator, etc.). Preferably one or more lockout units 26 are attached between the skid steer loader 16 and the walking beam 52 for allowing dampening or termination of the movement of the walking beam 52.

Figure 5A:
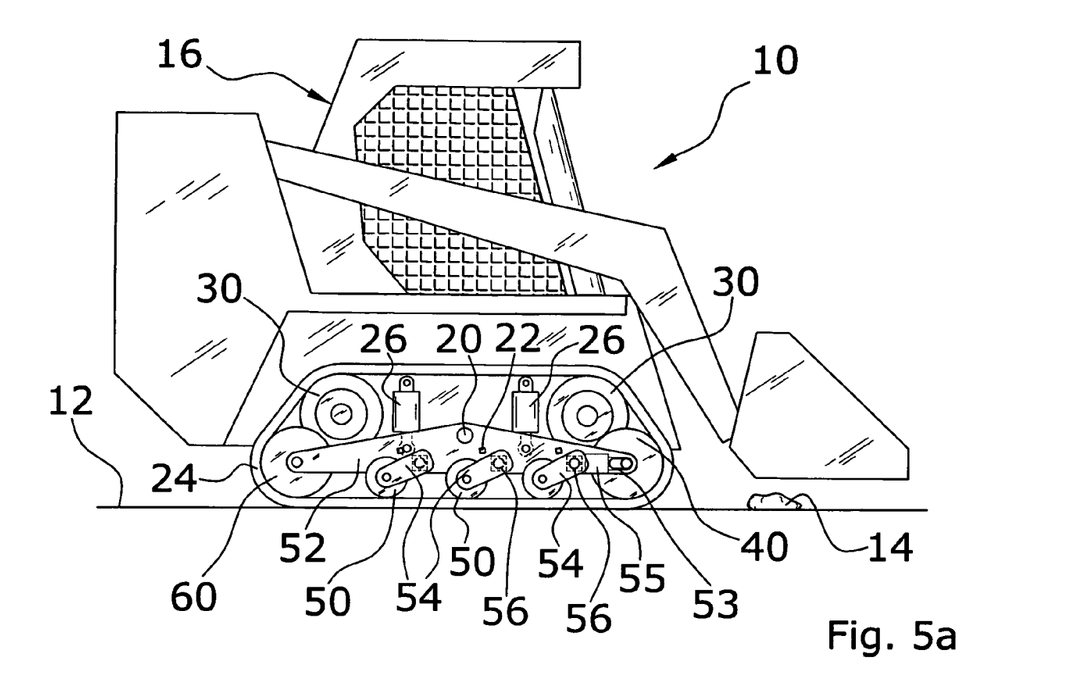
FIG. 5a is a side view of a fifth embodiment of the present invention approaching an obstacle on a ground surface.

FIGS. 5a through 5d of the drawings illustrate the overall operation and usage of the fifth alternative embodiment. FIG. 5a illustrates the track 24 suspension in a normal state operating on a substantially level ground surface 12.

Figure 5B:
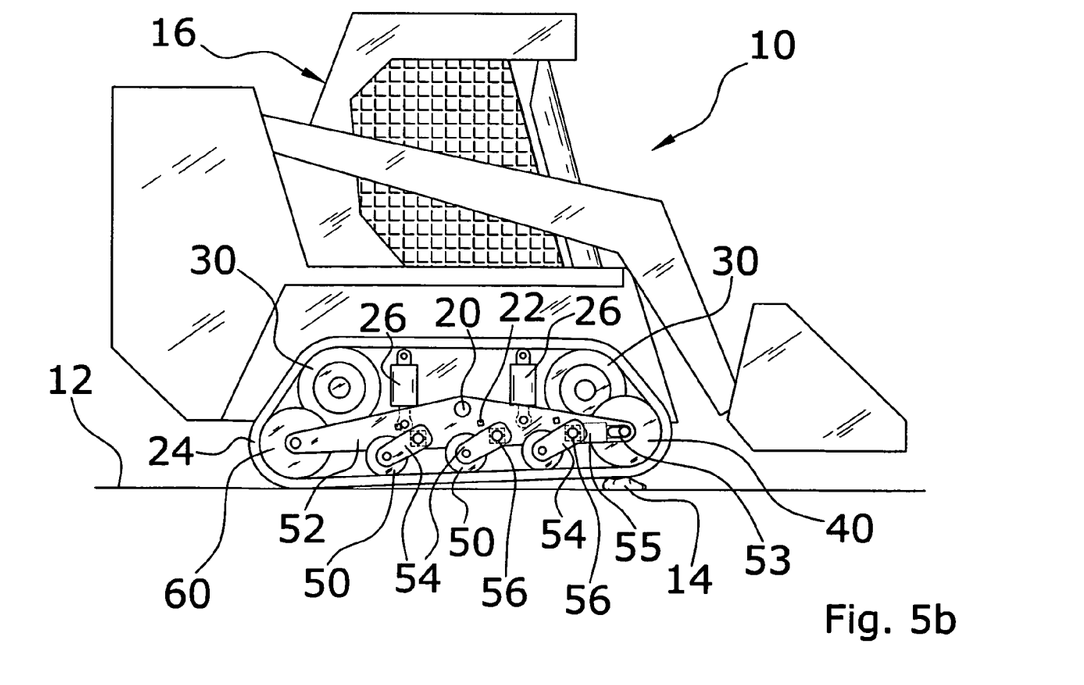
FIG. 5b is a side view of the fifth embodiment of the present invention with the obstacle positioned beneath a front portion of the track.

FIG. 5b illustrates the front portion of the track 24 engaging an obstacle 14 (e.g. rock) wherein the front roller 40 and the front portion of the walking beam 52 are forced upwardly by the obstacle 14. When the front roller 40 is forced upwardly, the rear roller 60 is forced downwardly.

Figure 5C:
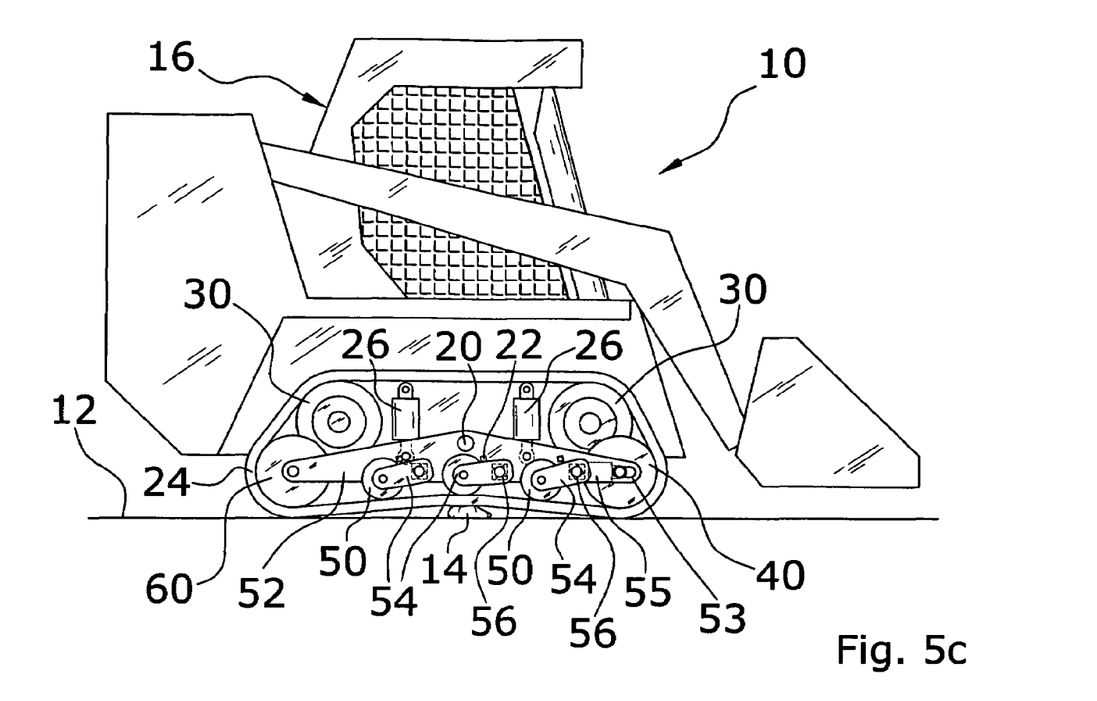
FIG. 5c is a side view of the fifth embodiment of the present invention with the obstacle positioned beneath a middle portion of the track.

FIG. 5c illustrates the track 24 traversing over the obstacle 14 with the walking beam 52 in its original state. The lower idlers 50 are pivoted upwardly because of the upward force on the track 24 caused by the obstacle 14. Because the track 24 has increased in tension from the upwardly movement of the lower idlers 50 by the obstacle 14, the front roller 40 is compressed rearwardly upon the bias unit 55 to relieve the extra tension.

Figure 5D:
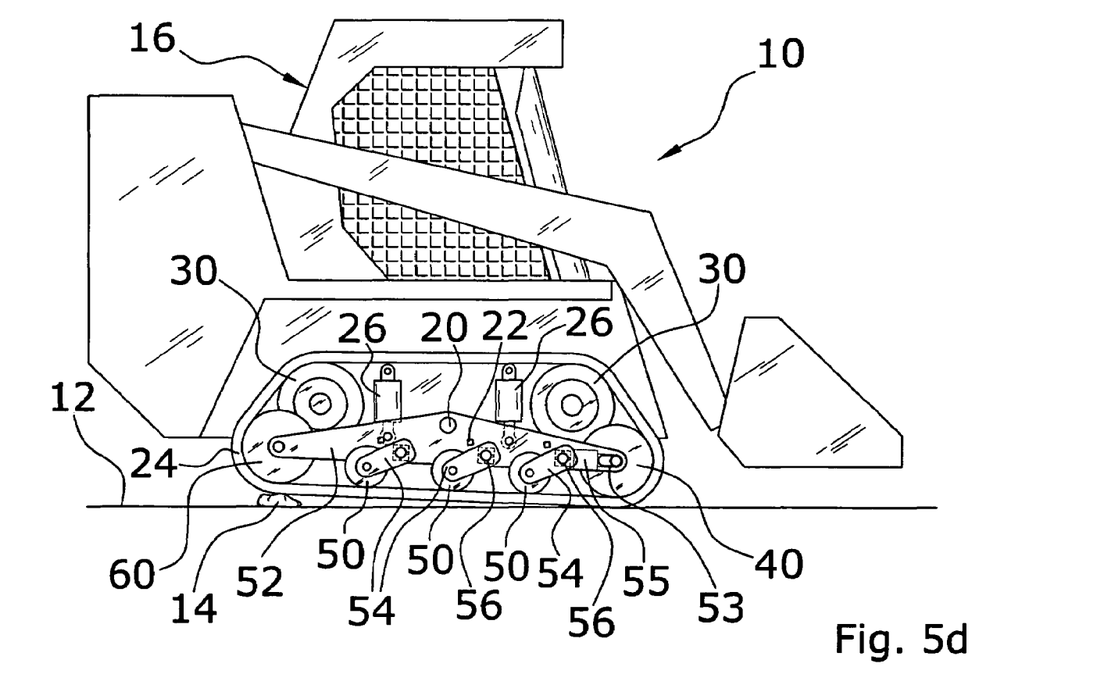
FIG. 5d is a side view of the fifth embodiment of the present invention with the obstacle positioned beneath a rear portion of the track.

FIG. 5d illustrates the rear portion of the track 24 engaging the obstacle 14 wherein the rear roller 60 and the rear portion of the walking beam 52 are forced upwardly by the obstacle 14. When the rear roller 60 is forced upwardly, the rear roller 60 is forced downwardly. After the obstacle 14 has been passed over, the rear roller 60 and the walking beam 52 return to their normal position as shown in FIG. 5a of the drawings.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

I claim:

1. A track suspension system for a skid steer loader, comprising:
   an undercarriage adapted to be attached to a skid steer loader;
   a first drive wheel adapted to be attached to a first wheel axle or a drive shaft of the skid steer loader;
   a front roller movably and rotatably attached to a front portion of said undercarriage;
   a rear roller movably and rotatably attached to a rear portion of said undercarriage;
   a plurality of lower idlers movably and rotatably attached to said undercarriage;
   a track movably extending about said first drive wheel, said front roller, said rear roller and said plurality of lower idlers; and
   a front walking beam pivotally attached to said undercarriage, a front connector rotatably supporting said front roller, and a front upper member pivotally connected to the undercarriage and a first portion of said front connector, wherein said front walking beam rotatably supports one of said plurality of said lower idlers and wherein an opposing end of said front walking beam is pivotally connected to a second portion of said front connector.

2. The track suspension system for a skid steer loader of claim 1, including a middle walking beam pivotally attached to said undercarriage, wherein said middle walking beam rotatably supports a pair of said plurality of said lower idlers.

3. The track suspension system for a skid steer loader of claim 1, including a rear walking beam pivotally attached to said undercarriage, a rear connector rotatably supporting said rear roller, and a rear upper member pivotally connected to the undercarriage and a first portion of said rear connector, wherein said rear walking beam rotatably supports one of said plurality of said lower idlers and wherein an opposing end of said rear walking beam is pivotally connected to a second portion of said rear connector.

4. The track suspension system for a skid steer loader of claim 1, including a tension idler movably and rotatably connected to said front portion of said undercarriage.

5. The track suspension system for a skid steer loader of claim 4, including a tension connector pivotally attached to said undercarriage and rotatably supporting said tension idler.

6. The track suspension system for a skid steer loader of claim 5, including a tension actuator connected between said tension connector and said undercarriage, wherein said tension actuator provides a biasing force upon said tension connector for causing said tension idler to maintain said track in a substantially taut state.

7. A track suspension system for a skid steer loader, comprising:
   an undercarriage adapted to be attached to a skid steer loader;
   a first drive wheel adapted to be attached to a first wheel axle or a drive shaft of the skid steer loader;
   a front roller movably and rotatably attached to a front portion of said undercarriage;
   a rear roller movably and rotatably attached to a rear portion of said undercarriage;
   a plurality of lower idlers movably and rotatably attached to said undercarriage;
   a track movably extending about said first drive wheel, said front roller, said rear roller and said plurality of lower idlers; and
   a rear walking beam pivotally attached to said undercarriage, a rear connector rotatably supporting said rear roller, and a rear upper member pivotally connected to the undercarriage and a first portion of said rear connector, wherein said rear walking beam rotatably supports one of said plurality of said lower idlers and wherein an opposing end of said rear walking beam is pivotally connected to a second portion of said rear connector.

8. The track suspension system for a skid steer loader of claim 7, including a middle walking beam pivotally attached to said undercarriage, wherein said middle walking beam rotatably supports a pair of said plurality of said lower idlers.

9. The track suspension system for a skid steer loader of claim 7, including a front walking beam pivotally attached to said undercarriage, a front connector rotatably supporting said front roller, and a front upper member pivotally connected to the undercarriage and a first portion of said front connector, wherein said front walking beam rotatably supports one of said plurality of said lower idlers and wherein an opposing end of said front walking beam is pivotally connected to a second portion of said front connector.

10. The track suspension system for a skid steer loader of claim 7, including a tension idler movably and rotatably connected to said front portion of said undercarriage.

11. The track suspension system for a skid steer loader of claim 10, including a tension connector pivotally attached to said undercarriage and rotatably supporting said tension idler.

12. The track suspension system for a skid steer loader of claim 11, including a tension actuator connected between said tension connector and said undercarriage, wherein said tension actuator provides a biasing force upon said tension connector for causing said tension idler to maintain said track in a substantially taut state.

* * * * *